US012004197B2

(12) United States Patent
Wang et al.

(10) Patent No.: US 12,004,197 B2
(45) Date of Patent: Jun. 4, 2024

(54) METHOD OF AND APPARATUS FOR TRANSMITTING MULTIMEDIA BROADCAST MULTICAST SERVICE RECEPTION STATUS

(75) Inventors: He Wang, Shanghai (CN); Chandrika Worrall, Newbury (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 2316 days.

(21) Appl. No.: 13/703,808

(22) PCT Filed: Jun. 21, 2010

(86) PCT No.: PCT/CN2010/074159
§ 371 (c)(1),
(2), (4) Date: Dec. 12, 2012

(87) PCT Pub. No.: WO2011/160279
PCT Pub. Date: Dec. 29, 2011

(65) Prior Publication Data
US 2013/0083720 A1 Apr. 4, 2013

(51) Int. Cl.
*H04W 72/30* (2023.01)
*H04W 4/06* (2009.01)
(Continued)

(52) U.S. Cl.
CPC .............. *H04W 72/30* (2023.01); *H04W 4/06* (2013.01); *H04W 4/50* (2018.02); *H04W 24/10* (2013.01); *H04W 72/00* (2013.01)

(58) Field of Classification Search
CPC ...... H04W 72/005; H04W 4/06; H04B 7/212; H04B 7/26
(Continued)

(56) References Cited

U.S. PATENT DOCUMENTS 8,477,644 B2 * 7/2013 Sugawara ......... H04W 72/1231
455/446
2003/0207696 A1 * 11/2003 Willenegger ......... H04L 1/0083
455/522
(Continued)

FOREIGN PATENT DOCUMENTS

CN 1870468 A 11/2006
CN 101262635 9/2008
(Continued)

OTHER PUBLICATIONS

International Search Report for PCT/CN2010/074159 dated Mar. 31, 2011.
(Continued)

*Primary Examiner* — Walter J Divito
*Assistant Examiner* — Camquyen Q. Thai
(74) *Attorney, Agent, or Firm* — Lippes Mathias LLP

(57) ABSTRACT

The invention proposes a method of transmitting a multimedia broadcast multicast service reception status message, wherein a terminal receives a radio resource control message from a base station; determines whether the radio resource control message satisfies a predetermined condition; and if the radio resource control message satisfies the predetermined condition, then the terminal transmits the multimedia broadcast multicast service reception status message to the base station, wherein the multimedia broadcast multicast service reception status message is used for identifying a multimedia broadcast multicast service being received by the terminal With the technical solution of the invention, the base station can obtain a reception status message, transmitted by the terminal, of at least one multimedia broadcast multicast service at the terminal side to thereby count the number of broadcast or multicast receiving users of the
(Continued)

multimedia broadcast multicast service in operation and perform other relevant processes.

12 Claims, 5 Drawing Sheets

(51) Int. Cl.
*H04W 4/50* (2018.01)
*H04W 24/10* (2009.01)
*H04W 72/00* (2023.01)

(58) Field of Classification Search
USPC .... 370/252, 312, 335, 337, 348, 340, 395.3, 370/432; 709/204, 231
See application file for complete search history.

(56) References Cited

U.S. PATENT DOCUMENTS

| | | | | |
|---|---|---|---|---|
| 2003/0231612 | A1* | 12/2003 | Kim | H04W 36/12 370/342 |
| 2004/0008646 | A1 | 1/2004 | Park et al. | |
| 2004/0151133 | A1* | 8/2004 | Yi et al. | |
| 2004/0224698 | A1* | 11/2004 | Yi | H04W 76/10 455/515 |
| 2005/0042987 | A1* | 2/2005 | Lee | H04W 72/005 455/67.11 |
| 2005/0070277 | A1 | 3/2005 | Hu | |
| 2005/0090278 | A1* | 4/2005 | Jeong et al. | |
| 2005/0174956 | A1* | 8/2005 | Yi | H04W 76/068 370/312 |
| 2005/0177620 | A1* | 8/2005 | Lee | H04W 72/005 709/204 |
| 2007/0191019 | A1* | 8/2007 | Fischer | H04W 72/005 455/452.2 |
| 2008/0032698 | A1* | 2/2008 | Gerstenberger et al. | |
| 2008/0045228 | A1* | 2/2008 | Zhang | H04L 1/0015 455/450 |
| 2008/0165717 | A1* | 7/2008 | Chen | H04W 72/005 370/312 |
| 2010/0014446 | A1 | 1/2010 | Chun et al. | |
| 2010/0124929 | A1* | 5/2010 | Lee | H04W 48/20 455/436 |
| 2010/0167767 | A1 | 7/2010 | Okada | |
| 2010/0208597 | A1* | 8/2010 | Chun | H04W 74/002 370/252 |
| 2010/0208707 | A1* | 8/2010 | Hamabe | H04W 36/0094 370/332 |
| 2010/0216454 | A1 | 8/2010 | Ishida et al. | |
| 2010/0226263 | A1* | 9/2010 | Chun et al. | |
| 2010/0272001 | A1* | 10/2010 | Lee et al. | |
| 2011/0019648 | A1 | 1/2011 | Huang et al. | |
| 2011/0194428 | A1* | 8/2011 | Wang et al. | |
| 2011/0222457 | A1* | 9/2011 | Lee | H04W 28/06 370/312 |
| 2011/0235565 | A1* | 9/2011 | Wu | H04W 72/005 370/312 |
| 2012/0076017 | A1* | 3/2012 | Luo | H04L 1/0026 370/252 |
| 2012/0099463 | A1* | 4/2012 | Saito | H04L 5/001 370/252 |

FOREIGN PATENT DOCUMENTS

| | | | |
|---|---|---|---|
| CN | 101273658 A | 9/2008 | |
| CN | 101540951 A | 9/2009 | |
| CN | 101583082 | 11/2009 | |
| EP | 1879403 A1 | 1/2008 | |
| EP | 1959617 | 8/2008 | |
| EP | 2110997 | 10/2009 | |
| EP | 2259618 A1 | 12/2010 | |
| JP | 2003-348643 | 12/2003 | |
| WO | WO 2005101706 A1 * | 10/2005 | ............ H04W 68/00 |
| WO | WO 2006019243 A1 * | 2/2006 | ............ H04W 48/20 |
| WO | WO 2006088292 A1 * | 8/2006 | ........... H04L 12/189 |
| WO | WO 2007040300 A1 * | 4/2007 | .......... H04W 72/005 |
| WO | WO 2007078164 A1 * | 7/2007 | .......... H04W 72/005 |
| WO | WO 2007148934 A1 * | 12/2007 | ........... H04L 1/0026 |
| WO | WO 2008137354 A1 * | 11/2008 | ........ H04W 36/0055 |
| WO | WO 2008155698 A1 * | 12/2008 | .......... H04W 72/005 |
| WO | WO 2009116614 A1 | 7/2011 | |

OTHER PUBLICATIONS

"Further enhancements to MBMS for LTE" 3GPP Work Item Description, RP 100691, TSG-Ran Meeting 48, Seoul, Korea, Jun. 1-4, 2010.

"3$^{RD}$ Generation Partnership Project; Technical Specification Group Radio Access Network; Evolved Universal Terrestrial Radio Access (E-UTRA); Radio Resource Control (RRC); Protocol Specification", 3GPP TS 36.331, v9.3.0, Jun. 2010.

European Search Report dated Aug. 15, 2015.

Huawei, "Email discussion on MBMS value range [67b#14]", R2-096531, 3GPP TSG-RAN WG2 Meeting #68, Nov. 9-13, 2009, Jeju, Korea.

\* cited by examiner

METHOD OF AND APPARATUS FOR TRANSMITTING MULTIMEDIA BROADCAST MULTICAST SERVICE RECEPTION STATUS

FIELD OF THE INVENTION

The present disclosure relates to a wireless communication network service and particularly to a method of and apparatus for transmitting a reception status message of a multimedia broadcast multicast service in a communication network.

BACKGROUND OF THE INVENTION

A Multimedia Broadcast Multicast Service (MBMS) is the technical foundation of a mobile phone television service in the field of third-generation mobile communications.

The MBMS supports two service patterns of multimedia broadcast service and multicast service, and it can either broadcast multimedia video information directly to all the users or transmit it to a group of charged subscribers for watching. It can assist an operator in deploying numerous commercial applications of multimedia advertisements, free and charged television channels, mass color messaging, etc. The operator can deploy a mobile phone television service at a low cost of network deployment.

In terms of a capacity, the MBMS provides a transmission mechanism of point-to-multipoint multimedia transmission and a service pattern of "Send Once, Change Many Times", wherein the consumption of resources is independent of the growing number of users, thereby offering an underlying solution for saving scarce air interface resources and other transmission resources of a 3G network and for obviating the insufficient capacity of the mobile network.

The advantages of the MBMS in terms of the capacity and the cost will become more apparent with an increasing number of users, and when there are a low number of multicast users or there is no multicast user, a dedicated channel can be allocated to the users or the multicast service channel can be disabled flexibly in the network. However a sufficient technical solution has been absent for the MBMS to count the number of the broadcast or multicast users of the MBMS in operation.

SUMMARY OF THE INVENTION

In view of the foregoing drawbacks in the prior art, the invention proposes a method of and a corresponding apparatus for transmitting a reception status of a multimedia broadcast multicast service in a communication network, so as to count the number of broadcast or multicast receiving users of the MBMS in operation.

According to an embodiment of the invention, there is provided a method of transmitting a multimedia broadcast multicast service reception status message in a terminal of a wireless communication network, the method comprising the steps of: receiving a radio resource control message from a base station; determining whether the radio resource control message satisfies a predetermined condition; and if the radio resource control message satisfies the predetermined condition, transmitting the multimedia broadcast multicast service reception status message to the base station, wherein the multimedia broadcast multicast service reception status message is used for identifying a multimedia broadcast multicast service being received by the terminal, and the number of multimedia broadcast multicast services being received may be one or more.

Optionally the predetermined condition in the step of determining whether the radio resource control message satisfies the predetermined condition comprises at least any one of:
that the radio resource control message is received for a first time after the terminal is powered on or received from a new base station for a first time when the terminal is handed over to a new cell, and indication information in the radio resource control message indicates that the terminal is required to transmit the multimedia broadcast multicast service reception status message;
that indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message; and
that the radio resource control message comprises indication information, and the indication information indicates that the terminal is required to transmit the multimedia broadcast multicast service reception status message, and a previously received radio resource control message does not comprise indication information.

According to another embodiment of the invention, there is provided a method in a base station of a wireless communication network, of requesting for a transmission of a multimedia broadcast multicast service reception status message, the method comprising the step of: transmitting a radio resource control message to a terminal, the radio resource control message comprising indication information for identifying at least one multimedia broadcast multicast service requiring the terminal to transmit a reception status.

Optionally the method of requesting for a transmission of a multimedia broadcast multicast service reception status message further comprises: receiving a multimedia broadcast multicast service reception status message from the terminal, wherein the multimedia broadcast multicast service reception status message is used for identifying a multimedia broadcast multicast service being received by the terminal.

According to another embodiment of the invention, there is provided an apparatus in a terminal of a wireless communication network, for transmitting a multimedia broadcast multicast service reception status message, the apparatus comprising: a radio resource control message receiver, configured to receive a radio resource control message from a base station; a predetermined condition determining module, configured to determine whether the radio resource control message satisfies a predetermined condition; and a multimedia broadcast multicast service reception status message transmitter, configured to transmit the multimedia broadcast multicast service reception status message to the base station when the radio resource control message satisfies the predetermined condition; wherein the multimedia broadcast multicast service reception status message is used for identifying a multimedia broadcast multicast service being received by the terminal, and the number of multimedia broadcast multicast services being received may be one or more.

Optionally the predetermined condition followed by the predetermined condition determining module in the apparatus for transmitting a multimedia broadcast multicast service reception status message includes at least any one of:

that the radio resource control message is received for a first time after the terminal is powered on or received from a new base station for a first time when the terminal is handed over to a new cell, and indication information in the radio resource control message indicates that the terminal is required to transmit the multimedia broadcast multicast service reception status message;

that indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message; and that the radio resource control message comprises indication information, and the indication information indicates that the terminal is required to transmit the multimedia broadcast multicast service reception status message, and a previously received radio resource control message does not comprise indication information.

According to another embodiment of the invention, there is provided an apparatus in a base station of a wireless communication network, for requesting for a transmission of a multimedia broadcast multicast service reception status message, the apparatus comprising: a radio resource control message transmitter, configured to transmit a radio resource control message to a terminal, the radio resource control message comprising indication information for identifying at least one multimedia broadcast multicast service requiring the terminal to transmit a reception status.

Optionally the apparatus for requesting for a transmission of a multimedia broadcast multicast service reception status message further comprises: a multimedia broadcast multicast service reception status message receiver, configured to receive the multimedia broadcast multicast service reception status message from the terminal, wherein the multimedia broadcast multicast service reception status message is used for identifying a multimedia broadcast multicast service being received by the terminal.

In the embodiments of the invention, a base station transmits a radio resource control message to a terminal, and the radio resource control message comprises indication information for indicating at least one multimedia broadcast multicast service for which a reception status is required to be transmitted by the terminal. The terminal receives the radio resource control message from the base station, and determines whether the radio resource control message satisfies a predetermined condition. If the radio resource control message satisfies the predetermined condition, the terminal transmits a multimedia broadcast multicast service reception status message to the base station, wherein the multimedia broadcast multicast service reception status message is used for identifying the multimedia broadcast multicast service being received by the terminal. Correspondingly the base station receives the multimedia broadcast multicast service reception status message from the terminal. With the foregoing steps, the base station and a Multicell/Multicast Coordination Entity (MCE) in a communication network can obtain a reception status message of at least one MBMS at the terminal side from the terminal, to thereby count the number of broadcast or multicast receiving users of the MBMS in operation and perform other relevant processes.

BRIEF DESCRIPTION OF DRAWINGS

Other features, objects and advantages of the invention can become more apparent upon reviewing the following detailed description of non-limiting embodiments given with reference to the drawings in which.

Identical or similar reference numerals designate identical or similar features of steps or devices (modules) throughout the drawings.

DETAILED DESCRIPTION OF EMBODIMENTS

Particular embodiments of the invention will be detailed below by way of an example with reference to the drawings.

Figure 1:
FIG. 1 is a topology structural diagram of a communication network constituted of a terminal and a base station according to an embodiment of the invention.

FIG. 1 is a topology structural diagram of a communication network constituted of a terminal and a base station according to an embodiment of the invention. As illustrated, the communication network comprises the user equipment 10 and the base station 20. There is a communication connection between the user equipment 10 and the base station 20. Optionally there may be a relay node (not illustrated) included between the user equipment 10 and the base station 20 as well.

In an embodiment of the invention, MBMSs managed by a Multicell/Multicast Coordination Entity (MCE) (not illustrated) in the communication network are particularly electronic channels 1 to 10, and the MBMSs being received at the user equipment 10 side are the electronic channel 1, the electronic channel 2 and the electronic channel 3.

Figure 2:
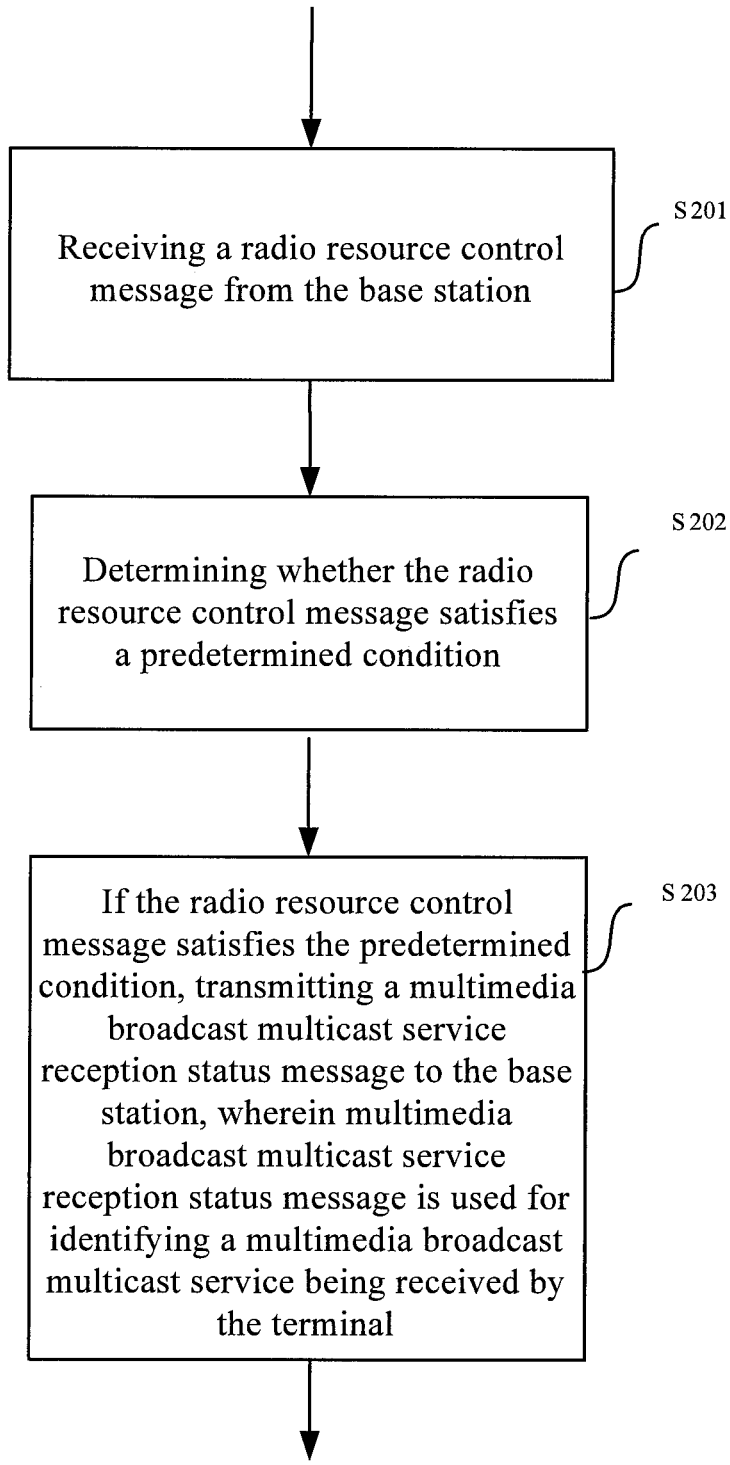
FIG. 2 is a flow chart of a method of transmitting a MBMS reception status message in a terminal of a wireless communication network according to an embodiment of the invention.

FIG. 2 is a flow chart of a method of transmitting a MBMS reception status message in a user equipment of a wireless communication network according to an embodiment of the invention. As illustrated, the method comprises three steps S201, S202 and S203 performed by the user equipment 10.

Firstly, in the step S201, the user equipment 10 receives a radio resource control message from the base station 20.

Next in the step S202, the user equipment 10 determines whether the radio resource control message satisfies a predetermined condition.

In the step S203, if the radio resource control message satisfies the predetermined condition, then the user equipment 10 transmits a multimedia broadcast multicast service reception status message to the base station 20.

Figure 4:
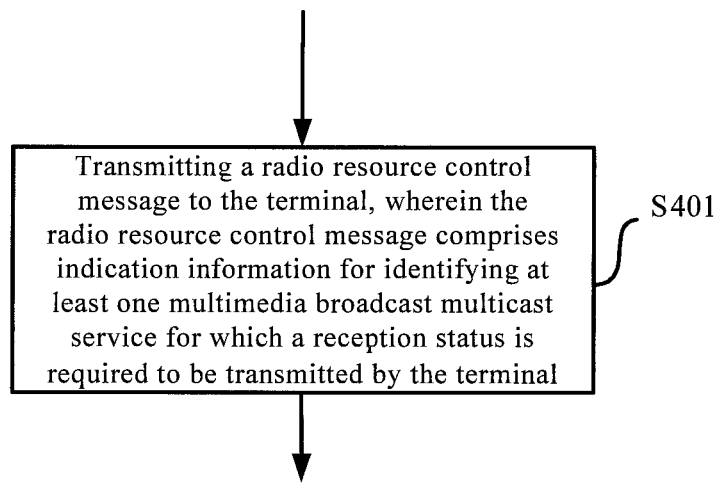
FIG. 4 is a flow chart of a method of requesting for a transmission of a MBMS reception status message in a base station of a wireless communication network according to a further embodiment of the invention.

FIG. 4 is a flow chart of a method of requesting for a transmission of a MBMS reception status message in a base station of a wireless communication network according to a further embodiment of the invention. As illustrated, the method comprises a step S401 performed by the base station 20.

In the step S401, the base station 20 transmits a radio resource control message to the user equipment 10, wherein the radio resource control message comprises indication information for identifying at least one multimedia broadcast multicast service for which a reception status is required to be transmitted by the user equipment 10.

The method of transmitting a MBMS reception status message in the user equipment 10 and the method of requesting for a transmission of a MBMS reception status message in the base station according to the foregoing embodiments of the invention will be described below with reference to FIG. 1, FIG. 2 and FIG. 4.

Assumed the base station 20 needs to obtain reception statuses of the electronic channel 1, the electronic channel 3, the electronic channel 5, the electronic channel 6 and the electronic channel 7 at the user equipment 10 side, that is, the base station 20 needs to obtain information about whether the foregoing electronic channels are being received by the user equipment 10. At this time, in the step S401 as illustrated in FIG. 4, the base station 20 transmits a radio resource control message to the user equipment 10, wherein the radio resource control message comprises indication information for identifying the foregoing electronic channel 1, electronic channel 3, electronic channel 5, electronic channel 6 and electronic channel 7 to thereby instruct the user equipment 10 to report reception statuses of the foregoing electronic channels on the user equipment 10 to the base station 20, that is, whether the foregoing electronic channels are being received by the user equipment 10.

Optionally in the step S401, the radio resource control message transmitted from the base station 20 is a MBSFNAreaConfiguration message. Optionally in the step S401, the base station 20 transmits the MBSFNAreaConfiguration message to the user equipment 10 over a Multicast Control Channel (MCCH), wherein the MB SFNAreaConfiguration message comprises indication information for identifying the foregoing electronic channel 1, electronic channel 3, electronic channel 5, electronic channel 6 and electronic channel 7 to thereby instruct the user equipment 10 report reception statuses of the foregoing electronic channels on the user equipment 10 to the base station 20, that is, whether the foregoing electronic channels are being received by the user equipment 10.

Optionally the indication information in the MBSFNAreaConfiguration message may comprise a reception status report indicator corresponding to at least one multimedia broadcast multicast service and can be respectively set in association with the session identifier (ID) corresponding to the at least one multimedia broadcast multicast service. For example, the base station 20 needs a statistic of reception statuses of the electronic channel 1, the electronic channel 3, the electronic channel 5, the electronic channel 6 and the electronic channel 7 at the user equipment 10 side, and then in the step S401, the indication information in the MBSFNAreaConfiguration message transmitted from the base station 20 includes reception status report indicators of the session ID1, the session ID3, the session ID5, the session ID6 and the session ID7 to indicate a request for reporting reception statuses of the electronic channel 1, the electronic channel 3, the electronic channel 5, the electronic channel 6 and the electronic channel 7 requested by the base station 20 respectively.

It is also assumed that MBMSs being received at the user equipment 10 side are the electronic channel 1, the electronic channel 2 and the electronic channel 3.

Then after the base station 20 transmits a radio resource control message to the user equipment 10, firstly, in the step S201 as illustrated in FIG. 2, the user equipment 10 receives the radio resource control message from the base station 20 at a time, e.g., a modification period point or a repetition period point. Particularly if the user equipment 10 was just powered on or the user equipment 10 was just handed over to a new cell and has established communication with a new base station, then the user equipment 10 generally receives the radio resource control message from the base station 20 at the closest modification period point or repetition period point in the time domain in the step S201. And if the user equipment 10 is in normal communication with the base station 20, then the user equipment 10 generally receives the radio resource control message from the base station 20 only at a modification period point in the step S201.

Next in the step S202, the user equipment 10 determines whether the radio resource control message satisfies a predetermined condition.

In the step S203, if the radio resource control message satisfies the predetermined condition, then a MBMS reception status message is transmitted to the base station 20, wherein the MBMS reception status message is used for identifying a multimedia broadcast multicast service being received by the user equipment 10. In this embodiment, the multimedia broadcast multicast services being received by the user equipment 10 are the electronic channel 1, the electronic channel 2 and the electronic channel 3. Preferably the user equipment 10 reports a reception status of only the electronic channel specified by the base station 20 to the base station 20, e.g., the reception status of the electronic channel 1 at the user equipment side by transmitting the MBMS reception status message to the base station 20.

In another embodiment of the invention, preferably the radio resource control message in the foregoing respective embodiments is a MB SFNAreaConfiguration message. Correspondingly in the step S201, preferably the user equipment 10 receives the MBSFNAreaConfiguration message from the base station 20 over a multicast control channel Correspondingly in the step S401, the base station 20 preferably transmits the MBSFNAreaConfiguration message to the user equipment 10 over the multicast control channel. Here the indication information in the MBSFNAreaConfiguration message preferably comprises a reception status report indicator corresponding to at least one multimedia broadcast multicast service. For example, the base station 20 needs a statistic of reception statuses of the electronic channel 1, the electronic channel 3, the electronic channel 5, the electronic channel 6 and the electronic channel 7 at the user equipment 10 side, and then the indication information in the MB SFNAreaConfiguration message received by the user equipment 10 in this embodiment comprises reception status report indicators corresponding to the foregoing multimedia broadcast multicast services identified by the session ID1, the session ID3, the session ID5, the session ID6 and the session ID7, so as to indicate a request for reporting reception statuses of the electronic channel 1, the electronic channel 3, the electronic channel 5, the electronic channel 6 and the electronic channel 7 requested by the base station 20 respectively.

Here those skilled in the art shall appreciate that the radio resource control message, e.g., the MBSFNAreaConfiguration message, comprises the indication information at least for the purpose of identifying one or more multimedia broadcast multicast services for which a reception status is required to be transmitted by the user equipment 10. Stated otherwise, the invention will not be limited to any specific identification form, for example, possibly corresponding to a reception status report indicator which is set in association with the session identifier as long as the indication information can uniquely identify one or more relevant multimedia broadcast multicast services.

Figure 5:
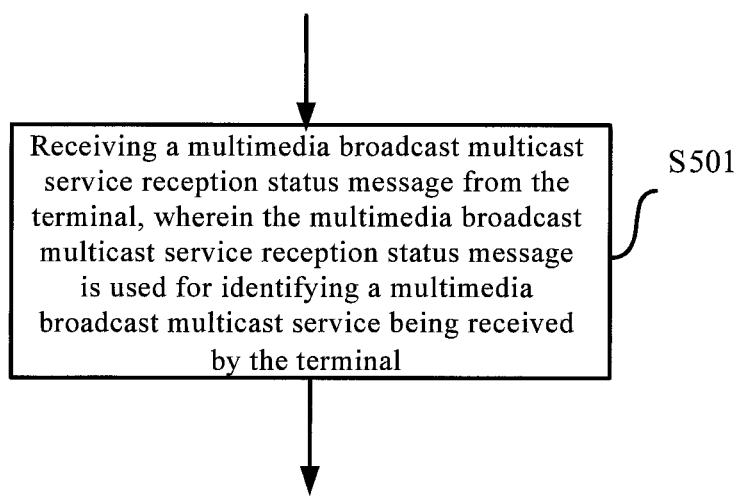
FIG. 5 is a flow chart of a step of receiving a MBMS reception status message in a method of requesting for a transmission of a MBMS reception status message according to another embodiment of the invention.

FIG. 5 is a flow chart of a step of receiving a MBMS reception status message in a method of requesting for a transmission of a MBMS reception status message according to another embodiment of the invention. In this embodiment, the method of requesting for a transmission of a MBMS reception status message in the base station 20 further comprises a step S501.

In the step S501, the base station 20 receives a MBMS reception status message from the user equipment 10, wherein the multimedia broadcast multicast service reception status message is used for identifying one or more multimedia broadcast multicast services being received by the user equipment 10, which are the electronic channel 1, the electronic channel 2 and the electronic channel 3 in this embodiment.

Figure 3:
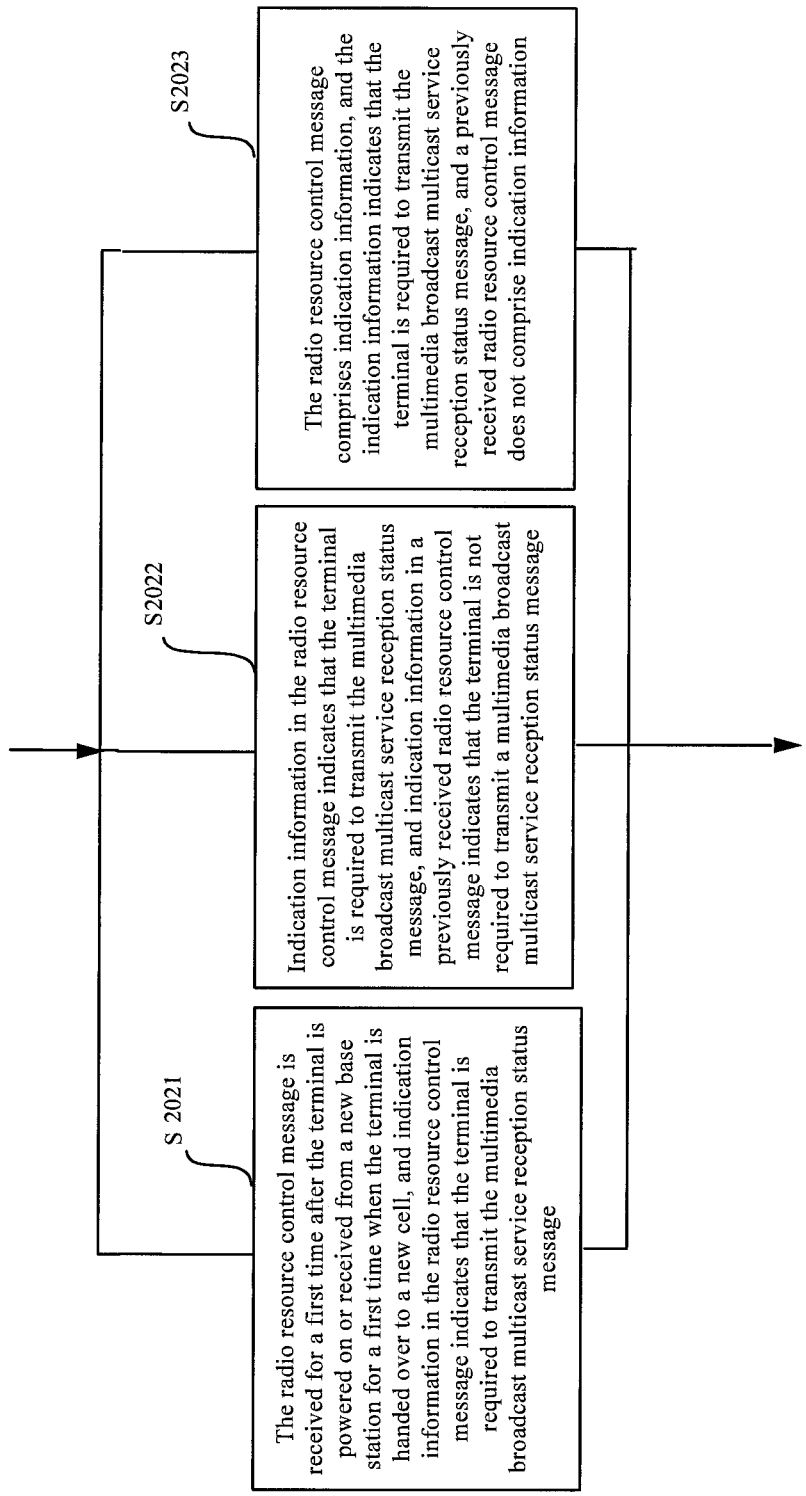
FIG. 3 is a flow chart of a step of determination for the predetermined condition in a method of transmitting a MBMS reception status message according to another embodiment of the invention.

FIG. 3 is a flow chart of a step of determination for the predetermined condition in a method of transmitting a MBMS reception status message according to another embodiment of the invention. The predetermined condition in the step S202 may comprise at least any one of: (I) that the radio resource control message received by the user equipment 10 in the step S201 is received for a first time after the user equipment 10 is powered on or received from a new base station for a first time when the user equipment 10 is handed over to a new cell, and indication information in the radio resource control message indicates that the user equipment 10 is required to transmit the multimedia broadcast multicast service reception status message; (II) that indication information in the radio resource control message received by the user equipment 10 in the step S201 indicates that the user equipment 10 is required to transmit the multimedia broadcast multicast service reception status message, and indication information in a radio resource control message previously received by the user equipment 10 indicates that the user equipment 10 is not required to transmit a multimedia broadcast multicast service reception status message; and (III) that the radio resource control message received by the user equipment 10 in the step S201 comprises indication information, and the indication information indicates that the user equipment is required to transmit the multimedia broadcast multicast service reception status message, and a radio resource control message previously received by the user equipment 10 does not comprise indication information.

Provided that the predetermined condition is that the radio resource control message received by the user equipment 10 is received for a first time after the terminal 10 is powered on or received from a new base station for a first time when the terminal 10 is handed over to a new cell, and indication information in the radio resource control message indicates that the terminal 10 is required to transmit the multimedia broadcast multicast service reception status message, then preferably in this embodiment, the radio resource control message is particularly a MBSFNAreaConfiguration message, and indication information in the MBSFNAreaConfiguration message comprises a reception status report indicator corresponding to at least one multimedia broadcast multicast service. At this time the indication information in the MBSFNAreaConfiguration message received by the user equipment 10 in this embodiment may include reception status report indicators corresponding to the multimedia broadcast multicast services identified by the session ID1, the session ID3, the session ID5, the session ID6 and the session ID7 to indicate a request for reporting reception statuses of the electronic channel 1, the electronic channel 3, the electronic channel 5, the electronic channel 6 and the electronic channel 7 requested by the base station 20 respectively. Also preferably, among the foregoing electronic channels, for an electronic channel, for which it is required to report whether it is being received by the user equipment 10, the base station 20 can set the reception status report indicator field corresponding to the session ID of the electronic channel to TRUE in the form of a Boolean value to thereby indicate that the base station 20 requires the user equipment 10 to report a reception status of the electronic channel identified by the session ID at the user equipment 10 side to the base station 20. Meanwhile, the base station 20 can set reception status report indicator field corresponding to the session ID to FALSE in the form of a Boolean value to thereby indicate that the base station 20 does not require the user equipment 10 to report a reception status of the electronic channel identified by the session ID at the user equipment 10 side to the base station 20. In the MBSFNAreaConfiguration message in this embodiment, for example, the base station 20 can set the reception status report indicator fields, e.g., possibly 1-bit or 1-byte variables, corresponding to the session ID1, the session ID3 and the session ID5 to TRUE in the form of a Boolean value to thereby indicate that the base station 20 requires the user equipment 10 to report statuses of whether the electronic channels 1, 3 and 5 are being received by the user equipment 10 to the base station 20. It also can set the reception status report indicator fields, e.g., possibly 1-bit or 1-byte variables, corresponding to the session ID6 and the session ID7 to FALSE in the form of a Boolean value to thereby indicate that the base station 20 does not require the user equipment 10 to report statuses of whether the electronic channels 6 and 7 are being received by the user equipment 10 to the base station 20. In this embodiment, in the step S2021, if the MBSFNAreaConfiguration message received by the user equipment 10 is received for a first time after the user equipment 10 is powered on or received from a new base station for a first time when the user equipment 10 is handed over to a new cell and has the content as described above in which the reception status report indicator fields, e.g., possibly 1-bit or 1-byte variables, corresponding to the session ID1, the session ID3 and the session ID5 are set to TRUE in the form of a Boolean value, then the user equipment 10 determines that the electronic channels 1, 3 and 5 indicated by the MBSFNAreaConfiguration message satisfy the predetermined condition in this embodiment.

Next in the step S203, the user equipment 10 may use a newly created MBMSReceptionStatusReport message as a multimedia broadcast multicast service reception status message, so as to identify one or more multimedia broadcast multicast services being received by the user equipment 10.

In this embodiment, MBMSs being received by the user equipment 10 are the electronic channel 1, the electronic channel 2 and the electronic channel 3. Then the user equipment 10 transmits indication information of the electronic channel 1 and the electronic channel 3, e.g., the session identifiers of the electronic channel 1 and the electronic channel 3, Session ID1 and Session ID3, in the MBMSReceptionStatusReport message/signaling to the base station 20 according to the result of the determination in the step S2021.

Provided that the predetermined condition is that indication information in the radio resource control message received by the user equipment 10 indicates that the terminal 10 is required to transmit the multimedia broadcast multicast service reception status message, and indication information in a radio resource control message previously received by the user equipment 10 indicates that the terminal 10 is not required to transmit a multimedia broadcast multicast service reception status message, then in this embodiment, if the MB SFNAreaConfiguration message received by the user equipment 10 is not received for the first time after the user equipment 10 is powered on or received from a new base station for a first time when the user equipment 10 is handed over to a new cell, and the indicator fields, e.g., possibly 1-bit or 1-byte variables, corresponding to the session ID3 and the session ID5 in the content of the MBSFNAreaConfiguration message are set to TRUE in the form of a Boolean value, and a MBSFNAreaConfiguration message previously received by the user equipment 10 comprises the session ID1, the session ID3 and the session ID5 with their corresponding reception status report indicator fields respectively being set to TRUE, TRUE and FALSE in the form of a Boolean value, then in the step S2022, the user equipment 10 determines that the electronic channel 5 indicated by the MBSFNAreaConfiguration message satisfies the predetermined condition in this embodiment and that the electronic channels 1 and 3 do not satisfy the predetermined condition in this embodiment.

Next in the step S203, the user equipment 10 may use a newly created MBMSReceptionStatusReport message as a multimedia broadcast multicast service reception status message, so as to identify one or more multimedia broadcast multicast services being received by the user equipment 10. In this embodiment, MBMSs being received by the user equipment 10 are the electronic channel 1, the electronic channel 2 and the electronic channel 3. It is determined as the result of the determination in the step S2021 that the electronic channel 1 and the electronic channel 3 do not satisfy the predetermined condition in this embodiment, and the electronic channel 2 is not specified in the MBSFNAreaConfiguration message, so the user equipment 10 may choose not to transmit a reception status message of any MBMS among the electronic channel 1, the electronic channel 2 and the electronic channel 3 to the base station 20. Those skilled in the art shall appreciate that it is determined here that the electronic channel 5 satisfies the predetermined condition in the step S2022 of this embodiment, but this electronic channel is not being received by the user equipment 10, thus the user equipment 10 may choose not to transmit any multimedia broadcast multicast service reception status message of the electronic channel 5.

Provided that the predetermined condition is that the radio resource control message received by the user equipment 10 comprises indication information, and the indication information indicates that the terminal is required to transmit the multimedia broadcast multicast service reception status message, and a radio resource control message previously received by the user equipment 10 does not comprise indication information, then in this embodiment, if the MBSFNAreaConfiguration message received by the user equipment 10 is not received for a first time after the user equipment 10 is powered on or received from a new base station for a first time when the user equipment 10 is handed over to a new cell but received in normal communication with the base station 20, and the content of the MBSFNAreaConfiguration message comprises the session ID1, the session ID3 and the session ID5 and their corresponding reception status report indicator fields, e.g., possibly 1-bit or 1-byte variables, are respectively set to TRUE, FALSE and TRUE in the form of a Boolean value, and the MBSFNAreaConfiguration message previously received by the user equipment 10 only comprises the session ID3 and the session ID5, and reception status report indicator fields corresponding to the session ID3 and the session ID5 are respectively set to TRUE and TRUE in the form of a Boolean value, then in the step S2022, the user equipment 10 determines that the electronic channel 1 indicated by the MB SFNAreaConfiguration message satisfies the predetermined condition in this embodiment and that the electronic channels 3 and 5 do not satisfy the predetermined condition in this embodiment.

Next in the step S203, the user equipment 10 may use a newly created MBMSReceptionStatusReport message as the multimedia broadcast multicast service reception status message, so as to identify one or more multimedia broadcast multicast services being received by the user equipment 10. In this embodiment, MBMSs being received by the user equipment 10 are the electronic channel 1, the electronic channel 2 and the electronic channel 3. The user equipment 10 transmits indication information of the electronic channel 1, e.g., the session identifier of the electronic channel 1, Session ID1 in the MBMSReceptionStatusReport message/signaling to the base station 20 according to the result of the determination in the step S2021.

In the foregoing embodiments, the multimedia broadcast multicast service reception status message comprises a the session identifier of a multimedia broadcast multicast service being received by the terminal, so as to identify the corresponding multimedia broadcast multicast service. Here those skilled in the art shall appreciate the multimedia broadcast multicast service reception status message in the foregoing embodiments is at least for the purpose of identifying one or more multimedia broadcast multicast services which is specified by the base station 20 in the MBSFNAreaConfiguration Message for requiring a report of its reception status, and which is also being received by the user equipment 10, and the multimedia broadcast multicast service reception status message can be a newly created message/signaling or a field newly added in an existing message/signal, so as to identify the one or more multimedia broadcast multicast services being received by the user equipment 10. The invention will not be limited to any specific form in which the multimedia broadcast multicast service reception status message is embodied.

Figure 6:
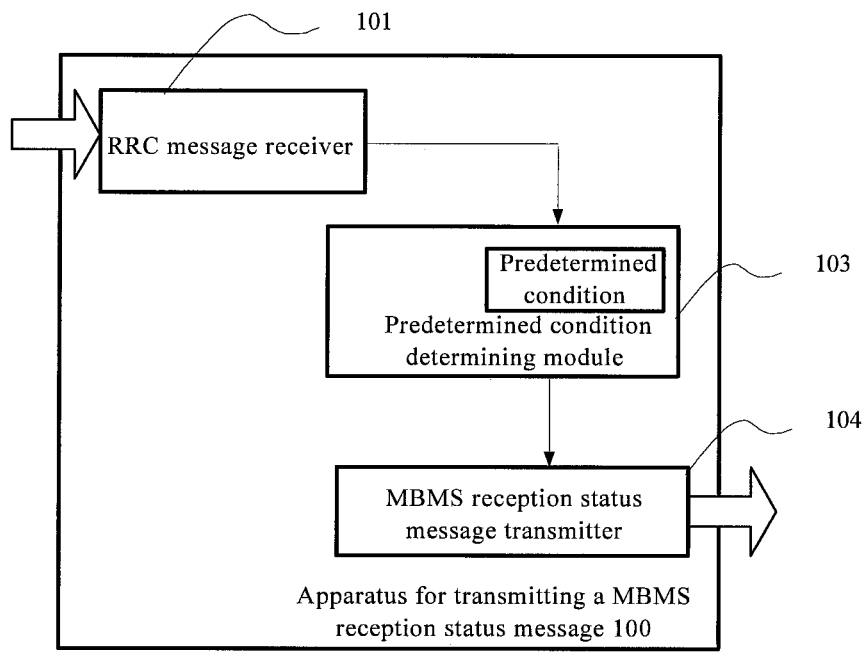
FIG. 6 is a schematic structural diagram of an apparatus for transmitting a MBMS reception status message in a terminal of a wireless communication network according to another embodiment of the invention.

FIG. 6 is a schematic structural diagram of an apparatus for transmitting a MBMS reception status message in the user equipment 10 of a wireless communication network according to another embodiment of the invention. As illustrated in FIG. 6, the apparatus 100 for transmitting a MBMS reception status message according to this embodiment generally comprises a radio resource control (RRC) message receiver 101, a predetermined condition determining module 103 and a MBMS reception status message transmitter 104.

Particularly the radio resource control message receiver 101 is configured to receive a radio resource control message from a base station. The predetermined condition determining module 103 is configured to determine whether the radio resource control message satisfies a predetermined condition. The MBMS reception status message transmitter 104 is configured to transmit the multimedia broadcast multicast service reception status message to the base station 20 when the radio resource control message satisfies the predetermined condition, wherein the multimedia broadcast multicast service reception status message is used for identifying a multimedia broadcast multicast service being received by the terminal, and the number of multimedia broadcast multicast services being received may be one or more.

Particularly the predetermined condition comprises at least any one or more of:
  that the radio resource control message is received for a first time after the terminal 10 is powered on or received from a new base station (not illustrated) for a first time when the user equipment 10 is handed over to a new cell, and indication information in the radio resource control message indicates that the terminal is required to transmit the multimedia broadcast multicast service reception status message;
  that indication information in the radio resource control message indicates that the terminal 10 is required to transmit the multimedia broadcast multicast service reception status message, and indication information in a previously received radio resource control message indicates that the terminal 10 is not required to transmit a multimedia broadcast multicast service reception status message; and
  that the radio resource control message comprises indication information, and the indication information indicates that the terminal 10 is required to transmit the multimedia broadcast multicast service reception status message, and previously received a radio resource control message does not comprise indication information.

Figure 7:
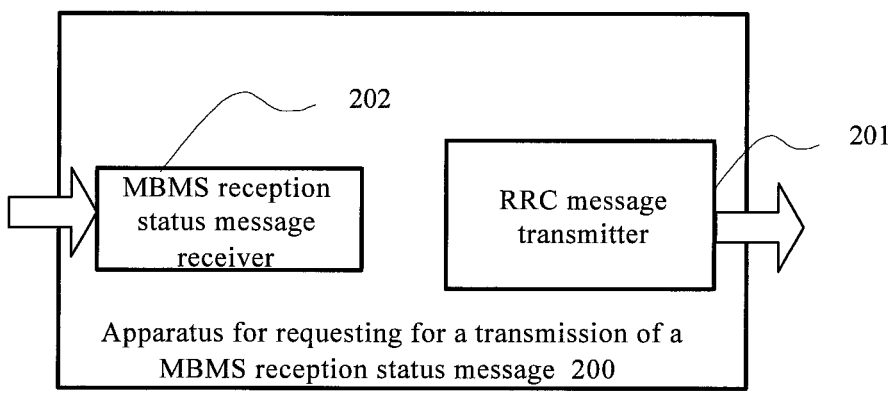
FIG. 7 is a schematic structural diagram of an apparatus for requesting for a transmission of a MBMS reception status message in a base station of a wireless communication network according to another embodiment of the invention.

FIG. 7 is a schematic structural diagram of an apparatus in the base station 20 of a wireless communication network, for requesting for a transmission of a MBMS reception status message according to another embodiment of the invention. The apparatus 200 for requesting for a transmission of a MBMS reception status message comprises an RRC message transmitter 201. The RRC message transmitter 201 is configured to transmit a radio resource control message to the user equipment 10, wherein the radio resource control message comprises indication information for identifying at least one multimedia broadcast multicast service requiring the user equipment 10 to transmit a reception status.

In another embodiment of the invention, the apparatus 200 for requesting for a transmission of a MBMS reception status message further comprises a MBMS reception status message receiver 202. The MBMS reception status message receiver 202 is configured to receive a multimedia broadcast multicast service reception status message from the user equipment 10, wherein the multimedia broadcast multicast service reception status message is used for identifying a multimedia broadcast multicast service being received by the user equipment 10.

Preferably the radio resource control message in the foregoing respective embodiments is a MBSFNAreaConfiguration message, and correspondingly in the apparatus 100 for transmitting a MBMS reception status message, the RRC message receiver 101 preferably receives the MBSFNAreaConfiguration message from the base station 20 over a multicast control channel Correspondingly in the apparatus 200 for requesting for a transmission of a MBMS reception status message, the RRC message transmitter preferably transmits the MBSFNAreaConfiguration message to the user equipment 10 over the multicast control channel Here the indication information in the MBSFNAreaConfiguration message preferably comprises a reception status report indicator corresponding to at least one multimedia broadcast multicast service. For example, the base station 20 needs a statistic of reception statuses of the electronic channel 1, the electronic channel 3, the electronic channel 5, the electronic channel 6 and the electronic channel 7 at the user equipment 10 side, and then the indication information in the MBSFNAreaConfiguration message received by the RRC message receiver 101 in this embodiment comprises reception status report indicators of the session ID1, the session ID3, the session ID5, the session ID6 and the session ID7, so as to indicate a request for reporting reception statuses of the electronic channel 1, the electronic channel 3, the electronic channel 5, the electronic channel 6 and the electronic channel 7 requested by the base station 20 respectively. Correspondingly the indication information in the MBSFNAreaConfiguration message transmitted by the RRC message transmitter 201 in the base station 20 also comprises reception status report indicators of the session ID1, the session ID3, the session ID5, the session ID6 and the session ID7, so as to indicate a request for reporting reception statuses of the electronic channel 1, the electronic channel 3, the electronic channel 5, the electronic channel 6 and the electronic channel 7 requested by the base station 20 respectively.

Here those skilled in the art shall appreciate that the radio resource control message, e.g., the MBSFNAreaConfiguration message, in the foregoing embodiments comprises the indication information at least for the purpose of identifying one or more multimedia broadcast multicast services for which a reception status is required to be transmitted by the user equipment 10. Stated otherwise, the invention will not be limited to any specific identification form, for example, possibly corresponding to a reception status report indicator which is set in association with the session identifier as long as the indication information can uniquely identify one or more relevant multimedia broadcast multicast services.

The apparatus 100 for transmitting a MBMS reception status message in the user equipment 10 and the apparatus 200 for requesting for a transmission of a MBMS reception status message in the base station 20 according to the foregoing embodiments of the invention will be described below with reference to FIG. 1, FIG. 6 and FIG. 7.

Assumed the base station 20 needs to obtain reception statuses of the electronic channel 1, the electronic channel 3, the electronic channel 5, the electronic channel 6 and the electronic channel 7 at the user equipment 10 side, that is, the base station 20 needs to obtain information about whether the foregoing electronic channels are being received by the user equipment 10. At this time, as illustrated in FIG. 7, the RRC message transmitter 201 in the apparatus 200 for requesting for a transmission of a MBMS reception status message transmits a radio resource control message to the user equipment 10, wherein the radio resource control message comprises indication information to indicate a request for reporting reception statuses of the foregoing electronic channel 1, electronic channel 3, electronic channel 5, electronic channel 6 and electronic channel 7 to thereby instruct the user equipment 10 to report reception statuses of the foregoing electronic channels on the user equipment 10 to the base station 20, that is, whether the foregoing electronic channels are being received by the user equipment 10.

Also assumed MBMSs being received at the user equipment 10 side are the electronic channel 1, the electronic channel 2 and the electronic channel 3.

Then after the RRC message transmitter 201 in the apparatus 200 for requesting for a transmission of a MBMS reception status message transmits a radio resource control message to the user equipment 10, firstly, as illustrated in FIG. 6, the RRC message receiver 101 in the apparatus 100 for transmitting a MBMS reception status message receives the radio resource control message from the base station 20 at a time, e.g., a modification period point or a repetition period point. Particularly if the user equipment 10 was just powered on or the user equipment 10 was just handed over to a new cell and has established communication with a new base station, then the RRC message receiver 101 generally receives the radio resource control message from the base station 20 at the closest modification period point or repetition period point in the time domain. And if the user equipment 10 is in normal communication with the base station 20, then the RRC message receiver 101 generally receives the radio resource control message from the base station 20 only at a modification period point.

Next the predetermined condition determining module 103 determines whether the radio resource control message satisfies its predetermined condition.

Provided that the predetermined condition set in the predetermined condition determining module 103 is that the radio resource control message received by the RRC message receiver 101 is received for a first time after the terminal 10 is powered on or received from a new base station for a first time when the terminal 10 is handed over to a new cell, and indication information in the radio resource control message indicates that the terminal 10 is required to transmit the multimedia broadcast multicast service reception status message, then preferably in this embodiment, the radio resource control message is particularly a MB SFNAreaConfiguration message, and indication information in the MBSFNAreaConfiguration message comprises a reception status report indicator corresponding to at least one multimedia broadcast multicast service. At this time the indication information in the MBSFNArea-Configuration message received by the RRC message reveiver 101 in this embodiment may include reception status report indicators of the session ID1, the session ID3, the session ID5, the session ID6 and the session ID7, so as to indicate a request for reporting reception statuses of the electronic channel 1, the electronic channel 3, the electronic channel 5, the electronic channel 6 and the electronic channel 7 requested by the base station 20 respectively. Also preferably, among the foregoing electronic channels, for an electronic channel, for which it is required to report whether it is being received by the user equipment 10, the base station 20 can set the reception status report indicator field corresponding to the session ID of the electronic channel to TRUE in the form of a Boolean value to thereby indicate that the base station 20 requires the user equipment 10 to report a reception status of the electronic channel identified by the session ID at the user equipment 10 side to the base station 20. Meanwhile, the base station 20 can set the indicator field corresponding to the session ID to FALSE in the form of a Boolean value to thereby indicate that the base station 20 does not require the user equipment 10 to report a reception status of the electronic channel identified by the session ID at the user equipment 10 side to the base station 20. In the MBSFNAreaConfiguration message in this embodiment, for example, the base station 20 can set the indicator fields, e.g., possibly 1-bit or 1-byte variables, corresponding to the session ID1, the session ID3 and the session ID5 to TRUE in the form of a Boolean value to thereby indicate that the base station 20 requires the user equipment 10 to report statuses of whether the electronic channels 1, 3 and 5 are being received by the user equipment 10 to the base station 20. It also can set the reception status report indicator fields, e.g., possibly 1-bit or 1-byte variables, corresponding to the session ID6 and the session ID7 to FALSE in the form of a Boolean value to thereby indicate that the base station 20 does not require the user equipment 10 to report statuses of whether the electronic channels 6 and 7 are being received by the user equipment 10 to the base station 20. In this embodiment, if the MBSFNAreaConfiguration message received by the user equipment 10 is received for a first time after the user equipment 10 is powered on or received from a new base station for a first time when the user equipment 10 is handed over to a new cell and has the content as described above in which the reception status report indicator fields, e.g., possibly 1-bit or 1-byte variables, corresponding to the session ID1, the session ID3 and the session ID5 are set to TRUE in the form of a Boolean value, then the predetermined condition determining module 103 determines that the electronic channels 1, 3 and 5 indicated by the MBSFNAreaConfiguration message satisfy the predetermined condition in this embodiment.

Next the MBMS reception status message transmitter 104 may use a newly created MB MSReceptionStatusReport message as a multimedia broadcast multicast service reception status message, so as to identify one or more multimedia broadcast multicast services being received by the user equipment 10. In this embodiment, MBMSs being received by the user equipment 10 are the electronic channel 1, the electronic channel 2 and the electronic channel 3. Then the MBMS reception status message transmitter 104 in the user equipment 10 transmits indication information of the electronic channel 1 and the electronic channel 3, e.g., the session identifiers of the electronic channel 1 and the electronic channel 3, Session ID1 and Session ID3, in the MBMSReceptionStatusReport message/signaling to the base station 20 according to the result of the determination.

Provided that the predetermined condition set in the predetermined condition determining module 103 is that indication information in the radio resource control message received by the RRC message receiver 101 in the user equipment 10 indicates that the terminal 10 is required to transmit the multimedia broadcast multicast service reception status message, and indication information in a radio resource control message previously received by the user equipment 10 indicates that the terminal 10 is not required to transmit a multimedia broadcast multicast service reception status message, then in this embodiment, if the MB SFNAreaConfiguration message received by the user equipment 10 is not received for a first time after the user equipment 10 is powered on or received from a new base station for a first time when the user equipment 10 is handed over to a new cell, and the reception status report indicator fields, e.g., possibly 1-bit or 1-byte variables, corresponding to the session ID3 and the session ID5 in the content of the MBSFNAreaConfiguration message are set to TRUE in the form of a Boolean value, and a MBSFNAreaConfiguration message previously received by the RRC message receiver 101 comprises the session ID1, the session ID3 and the session ID5 with their corresponding reception status report indicator fields respectively being set to TRUE, TRUE and FALSE in the form of a Boolean value, then the predetermined condition determining module 103 determines that the electronic channel 5 indicated by the MBSFNAreaConfiguration message satisfies the predetermined condition in this embodiment and that the electronic channels 1 and 3 do not satisfy the predetermined condition in this embodiment.

Next the MBMS reception status message transmitter 104 may use a newly created MBMSReceptionStatusReport message as a multimedia broadcast multicast service reception status message, so as to identify one or more multimedia broadcast multicast services being received by the user equipment 10. In this embodiment, MBMSs being received by the user equipment 10 are the electronic channel 1, the electronic channel 2 and the electronic channel 3. It is determined as the result of the determination that the electronic channel 1 and the electronic channel 3 do not satisfy the predetermined condition in this embodiment, and the electronic channel 2 is not specified in the MBSFNAreaConfiguration message, so the MBMS reception status message transmitter 104 may choose not to transmit a reception status message of any MBMS among the electronic channel 1, the electronic channel 2 and the electronic channel 3 to the base station 20. Those skilled in the art shall appreciate that it is determined here that the electronic channel 5 satisfies the predetermined condition set in the predetermined condition determining module 103 in this embodiment, but this electronic channel is not being received by the user equipment 10, thus the user equipment 10 may choose not to transmit any multimedia broadcast multicast service reception status message of the electronic channel 5.

Provided that the predetermined condition preset by the predetermined condition determining module 103 is that the radio resource control message received by the RRC message receiver 101 comprises indication information, and the indication information indicates that the terminal 10 is required to transmit the multimedia broadcast multicast service reception status message, and a radio resource control message previously received by the RRC message receiver 101 does not comprise indication information, then in this embodiment, if the MBSFNAreaConfiguration message received by the RRC message receiver 101 is not received for a first time after the user equipment 10 is powered on or received from a new base station for a first time when the user equipment 10 is handed over to a new cell but received in normal communication with the base station 20, and the content of the MBSFNAreaConfiguration message comprises the session ID1, the session ID3 and the session ID5 and their corresponding reception status report indicator fields, e.g., possibly 1-bit or 1-byte variables, are respectively set to TRUE, FALSE and TRUE in the form of a Boolean value, and the MBSFNAreaConfiguration message previously received by the RRC message receiver 101 only comprises the session ID3 and the session ID5, and reception status report indicator fields corresponding to the session ID3 and the session ID5 are respectively set to TRUE and TRUE in the form of a Boolean value, then the predetermined condition determining module 103 determines that the electronic channel 1 indicated by the MBSFNAreaConfiguration message satisfies the predetermined condition in this embodiment and that the electronic channels 3 and 5 do not satisfy the predetermined condition in this embodiment.

Next the MBMS reception status message transmitter 104 may use a newly created MBMSReceptionStatusReport message as the multimedia broadcast multicast service reception status message, so as to identify one or more multimedia broadcast multicast services being received by the user equipment 10. In this embodiment, MBMSs being received by the user equipment 10 are the electronic channel 1, the electronic channel 2 and the electronic channel 3. The MBMS reception status message transmitter 104 can choose to transmit indication information of the electronic channel 1, e.g., the session identifier of the electronic channel 1, Session ID1 in the MBMSReceptionStatusReport message/signaling to the base station 20 according to the result of the determination.

It shall be noted that the foregoing embodiments are merely illustrative but not to limit the invention. Any technical solutions without departing from the spirit of the invention shall fall into the scope of invention, including the use of different technical solutions appearing in different embodiments as arranged in any arrangement combination to advantage. Moreover any reference numerals in the claims shall not be construed as limiting the claims in question; the term "comprising" will not preclude another device(s) or step(s) which is (are) listed in the other claim(s) or the description; "a" or "an" preceding a device will not preclude the presence of a plurality of such a device; a function or functions of one or more of a plurality of devices included in an apparatus can be performed by the same device in hardware or software; and the terms "first", "second", "third", etc., are merely intended to designate a name but not to suggest any specific order.

The invention claimed is:

1. A method of transmitting a multimedia broadcast multicast service reception status message in a terminal of a wireless communication network, the method comprising:
   receiving a radio resource control message from a base station, wherein the radio resource control message is a multicast broadcast single frequency network area configuration message, and the receiving further comprises:
   receiving the multicast broadcast single frequency network area configuration message from the base station over a multicast control channel;
   determining whether the radio resource control message satisfies a predetermined condition; and
   if the radio resource control message satisfies the predetermined condition, transmitting the multimedia broadcast multicast service reception status message to the base station,
   wherein the multimedia broadcast multicast service reception status message is used for identifying a multimedia broadcast multicast service being received by the terminal, and
   wherein the predetermined condition comprises:
   that indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message.

2. The method according to claim 1, wherein the predetermined condition comprises:
   that the radio resource control message is received for a first time after the terminal is powered on or received from a new base station for a first time when the terminal is handed over to a new cell, and indication information in the radio resource control message indicates that the terminal is required to transmit the multimedia broadcast multicast service reception status message.

3. The method according to claim 1, wherein the predetermined condition comprises:
that the radio resource control message comprises indication information, and the indication information indicates that the terminal is required to transmit the multimedia broadcast multicast service reception status message, and a previously received radio resource control message does not comprise indication information.

4. The method according to claim 1, wherein:
the indication information in the multicast broadcast single frequency network area configuration message comprises a session identifier corresponding to at least one multimedia broadcast multicast service.

5. A method, in a base station of a wireless communication network, of requesting for a transmission of a multimedia broadcast multicast service reception status message, the method comprising:
transmitting a radio resource control message to a terminal, the radio resource control message comprising indication information for identifying at least one multimedia broadcast multicast service requiring the terminal to transmit a reception status, wherein the radio resource control message is a multicast broadcast single frequency network area configuration message, and the transmitting further comprises:
transmitting the multicast broadcast single frequency network area configuration message to the terminal over a multicast control channel,
wherein the indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message.

6. The method according to claim 5, wherein after the transmitting, the method further comprises:
receiving a multimedia broadcast multicast service reception status message from the terminal,
wherein the multimedia broadcast multicast service reception status message is used for identifying a multimedia broadcast multicast service being received by the terminal.

7. The method according to claim 6, wherein the multimedia broadcast multicast service reception status message comprises a session identifier of the multimedia broadcast multicast service being received by the terminal, so as to identify the corresponding multimedia broadcast multicast service.

8. The method according to claim 5, wherein the indication information in the multicast broadcast single frequency network area configuration message comprises a session identifier corresponding to the at least one multimedia broadcast multicast service.

9. An apparatus for transmitting a multimedia broadcast multicast service reception status message in a terminal of a wireless communication network, comprising:
a radio resource control message receiver, configured to receive a radio resource control message from a base station, wherein the radio resource control message is a multicast broadcast single frequency network area configuration message, and the receiving further comprises:
receiving the multicast broadcast single frequency network area configuration message from the base station over a multicast control channel;
a predetermined condition determining module, configured to determine whether the radio resource control message satisfies a predetermined condition; and
a multimedia broadcast multicast service reception status message transmitter, configured to transmit the multimedia broadcast multicast service reception status message to the base station when the radio resource control message satisfies the predetermined condition;
wherein the multimedia broadcast multicast service reception status message is used for identifying a multimedia broadcast multicast service being received by the terminal, and
wherein the predetermined condition comprises:
that indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message.

10. The apparatus according to claim 9, wherein the predetermined condition comprises any one of:
that the radio resource control message is received for a first time after the terminal is powered on or received from a new base station for a first time when the terminal is handed over to a new cell, and indication information in the radio resource control message indicates that the terminal is required to transmit the multimedia broadcast multicast service reception status message;
that indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message;
that the radio resource control message comprises indication information, and the indication information indicates that the terminal is required to transmit the multimedia broadcast multicast service reception status message, and a previously received radio resource control message does not comprise indication information.

11. An apparatus, in a base station of a wireless communication network, for requesting for a transmission of a multimedia broadcast multicast service reception status message, comprising:
a radio resource control message transmitter, configured to transmit a radio resource control message to a terminal, the radio resource control message comprising indication information for identifying at least one multimedia broadcast multicast service requiring the terminal to transmit a reception status, wherein the radio resource control message is a multicast broadcast single frequency network area configuration message, and the transmitting further comprises:

transmitting the multicast broadcast single frequency network area configuration message to the terminal over a multicast control channel, wherein the indication information in the radio resource control message indicates that the terminal is required to transmit the multimedia broadcast multicast service reception status message, and indication information in a previously received radio resource control message indicates that the terminal is not required to transmit a multimedia broadcast multicast service reception status message.

12. The apparatus according to claim 11, wherein further comprising:

a multimedia broadcast multicast service reception status message receiver, configured to receive the multimedia broadcast multicast service reception status message from the terminal, wherein the multimedia broadcast multicast service reception status message is used for identifying a multimedia broadcast multicast service being received by the terminal.

\* \* \* \* \*

UNITED STATES PATENT AND TRADEMARK OFFICE
CERTIFICATE OF CORRECTION

| | | |
|---|---|---|
| PATENT NO. | : 12,004,197 B2 | Page 1 of 1 |
| APPLICATION NO. | : 13/703808 | |
| DATED | : June 4, 2024 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2335 days.

Signed and Sealed this
Twenty-second Day of April, 2025

Coke Morgan Stewart
*Acting Director of the United States Patent and Trademark Office*